United States Patent Office

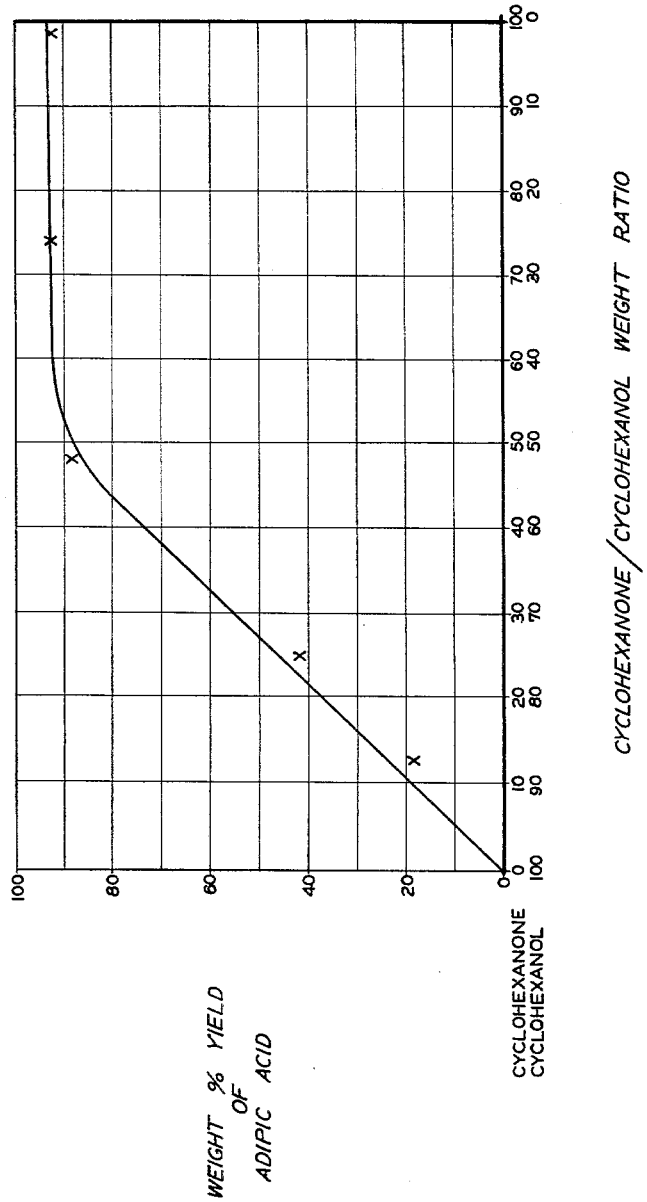

3,234,271
Patented Feb. 8, 1966

3,234,271
ADIPIC ACID PRODUCTION BY THE TWO STEP OXIDATION OF CYCLOHEXANE WITH OXYGEN
Robert S. Barker, Port Washington, and Max A. Cohen, Utopia, N.Y., assignors to Halcon International, Inc., a corporation of Delaware
Filed Mar. 18, 1963, Ser. No. 265,914
3 Claims. (Cl. 260—531)

This application is a continuation-in-part of application Serial No. 782,461 filed December 23, 1958, and now abandoned.

This application is concerned with a process for the production of adipic acid. In a preferred embodiment the present invention is concerned with a process for the production of adipic acid by the oxidation of mixtures comprising cyclohexanone and cyclohexanol. In another embodiment the present invention is concerned with a process for the production of adipic acid from cyclohexane by oxidation thereof, separation of cyclohexane from the oxidation mixture and recycle thereof, and further oxidation of the other products of oxidation.

Broadly, the invention is concerned with a process for the production of adipic acid comprising contacting a mixture comprising cyclohexanol and cyclohexanone in the liquid phase with molecular oxygen in the presence of a catalyst comprising manganese and a member selected from the group consisting of copper and iron and mixtures thereof in which mixture the weight ratio of cyclohexanone to cyclohexanol is at least about 1. Further, the invention is concerned with a process for the preparation of adipic acid comprising contacting a mixture comprising cyclohexanol and cyclohexanone in the liquid phase with molecular oxygen in the presence of a catalyst comprising manganese and a member selected from the group consisting of copper and iron and mixtures thereof and maintaining the weight ratio of cyclohexanone to cyclohexanol in such mixture at least about 1.

In another embodiment the invention is concerned with a process for the production of adipic acid from cyclohexane, comprising contacting cyclohexane with molecular oxygen in a first oxidation zone to produce a mixture of cyclohexanone, cyclohexanol and oxygenated products, separating unreacted cyclohexane and recycling it to said first oxidation zone, contacting said mixture with molecular oxygen in a second oxidation zone in the presence of a catalyst comprising manganese and copper and/or iron and separating adipic acid therefrom and recycling the residue to said second oxidation zone.

In still a further embodiment the application is concerned with a process for the production of adipic acid comprising contacting cyclohexane with molecular oxygen in a first oxidation zone at a temperature of about 150° C. and a pressure of about 150 p.s.i.g. to produce a mixture of cyclohexanone, cyclohexanol and oxygenated products, separating unreacted cyclohexane and recycling it to said first oxidation zone, contacting said mixture with molecular oxygen in a second oxidation zone at a temperature in the range of preferably from about 85 to 95° C. at a pressure of from about atm. to 1000 p.s.i.g. in the presence of a catalyst comprising manganese and copper and/or iron, separating adipic acid therefrom and recycling the residue to said second oxidation zone.

It is a particular feature of the present invention that cyclohexanol can be converted to adipic acid by oxidation, in the presence of catalysts, with molecular oxygen. It is known that cyclohexanone can be catalytically oxidized by molecular oxygen to adipic acid; processes for producing adipic acid have been described which comprise separation of cyclohexanone from the cyclohexanol with which it is found and subsequent oxidation of the cyclohexanone with molecular oxygen. Example 1 illustrates that using the processes previously known in the art, no adipic acid is obtained on oxidizing cyclohexanol under conditions wholly favorable for converting cyclohexanone thereto (Example 2).

It is a feature of the present invention that cyclohexanol can be converted to adipic acid easily and in good yield under the same conditions which serve for the conversion of cyclohexanone to adipic acid provided that the oxidation of the cyclohexanol is carried out in a solution in which cyclohexanone is being simultaneously oxidized to adipic acid and further, provided that the wt. ratio of cyclohexanone to cyclohexanol taken for oxidation is at least about 1. This is illustrated by the data of Example 3 and the drawing which plots that data and graphically shows the weight yield of adipic acid against the weight ratio of cyclohexanone to cyclohexanol taken for oxidation. The drawing shows that when the weight ratio of cyclohexanone to cyclohexanol is at least 1 (at least 50% cyclohexanone) the plateau on the curve is reached and a high yield of adipic acid, based on both cyclohexanol and cyclohexanone, is obtained. The reaction conditions required to obtain the data of Example 3 are precisely the same as those used in Examples 1 and 2.

It is a further feature of the present invention that adipic acid can now be obtained from both cyclohexanone and cyclohexanol without requiring that these two compounds be separated from each other when they are produced together.

In the oxidation of mixtures comprising cyclohexanone and cyclohexanol, according to the present invention, it is convenient to adjust the weight ratio of cyclohexanone to cyclohexanol to at least about 1 prior to contacting such mixture with molecular oxygen. While it is possible to carry out the oxidation of cyclohexanol in the presence of cyclohexanone in such amounts that the weight ratio of cyclohexanone to cyclohexanol is greater than 1, there is no necessity for doing so. This can be seen from the drawing which shows that the plateau is reached at a weight ratio of about 1. Thus, if cyclohexanone is in relatively short supply as compared to cyclohexanol, the maximum yields based on both cyclohexanone and cyclohexanol are obtained by starting with the cyclohexanone and cyclohexanol weight ratio at about 1.

It is also a feature of the present invention that the oil oxidation product of cyclohexane, obtained as in Example 5, is a superior initiator for the oxidation of cyclohexane compared to materials previously used as initiators such as cyclohexanone alone.

The invention is illustrated by but not restricted to the embodiments set forth in the following examples in which "parts" and "percent" are by weight unless otherwise indicated.

EXAMPLE 1

25 parts cyclohexanol were admixed with 25 parts acetic acid to which were added 0.28 part of manganese acetate and 0.4 part copper acetate. The mixture is maintained at 85 to 90° C. for about six hours during which time oxygen is bubbled through the mixture at a rate of about 40 liters per hour. The mixture is cooled to room temperature and a few crystals of adipic acid added in order to facilitate precipitation of any adipic acid formed during the oxidation. No adipic acid is obtained. Distillation of the reaction residue gives an almost quantitative recovery of the original unreacted cyclohexanol.

EXAMPLE 2

Example 1 is repeated, substituting for the cyclohexanol there used 50 parts of cyclohexanone. There is obtained 48.5 parts adipic acid.

EXAMPLE 3

Example 1 is repeated, substituting for the cyclohexanol there used the various mixtures containing the indicated weight ratios of the cyclohexanone and cyclohexanol as set forth in Table 1 below. There are obtained the indicated amounts of adipic acid.

*Table 1*

| Weight ratio of cyclohexanone to cyclohexanol | Weight percent yield of adipic acid based on cyclohexanone and cyclohexanol |
|---|---|
| 0/100 | 0 |
| 12/88 | 19.5 |
| 26/74 | 44.1 |
| 48/52 | 89.2 |
| 75/25 | 93.0 |
| 100/0 | 93.2 |

EXAMPLE 4

Example 3 is repeated, substituting for the copper acetate there utilized an equal weight of iron acetate. Substantially similar results are obtained.

EXAMPLE 5

Cyclohexane is added to a first oxidation zone maintained at 150° C. and at a pressure such as to maintain the cyclohexane in a liquid phase. Air is bubbled through the cyclohexane for about one hour at the rate of 0.7 to 1.0 s.c.f.m. Approximately 15% of the cyclohexane is converted to oil containing 34.2% cyclohexanone, 27% cyclohexanol and the remainder oxygenated compounds. All the unreacted cyclohexane is removed from the reaction mixture by distillation and is returned to the first oxidation zone for further conversion. 25 parts of the oil so obtained are admixed with 75 parts acetic acid, 0.15 part manganese acetate and 0.2 part copper acetate and the mixture fed to a second reaction zone maintained at 85 to 90° C. Oxygen is passed through at a rate of 1 to 2 s.c.f.m. for a period of about six hours. The reaction mixture is then cooled and adipic acid separated, and there is obtained 14.1 parts adipic acid.

In the above described oxidation of cyclohexane the admixture should be maintained at least about 150° C. Higher temperatures can be utilized but these will, of course, require higher pressures, in order that the cyclohexane be maintained in the liquid phase. The conversion of cyclohexane can be in the range of from about 3 to about 20%. Desirably, the conversion is in the range of 10 to 20% and it is preferred to utilize a conversion of approximately 15%. If the conversion of cyclohexane is less than approximately 3 to 5%, difficulty is encountered in the step of separating the cyclohexane from the oil. Conversions in excess of 20% are not desired because, in general, as conversion increases in this first stage oxidation of cyclohexane, the relative yield of cyclohexanone and cyclohexanol, based on converted cyclohexane, drops and the relative yield of undesirable side products increases. Moreover, with increase in conversion the amount of solid acids formed increases. These, since they have but limited solubility in the reaction mixture, cause handling problems.

In the oxidation of the oil described in Example 5, the temperature of the oxidation zone can be maintained in the range of from about 60 to 105° C., desirably in the range of 80 to 100° C. and preferably at 85 to 95° C. The pressure maintained should be sufficient so that the partial pressure of the oxygen is at least one-half atmosphere. Higher pressures may be used and in some cases it may be such that the partial pressure of the oxygen in the mixture going to the oxidation reactor is as high, approximately, as 200 lbs. The rate at which air or oxygen-containing gas is fed for the oxidation either of cyclohexane or of the oil thereby obtained is governed, in part at least, by the geometric configuration of the particular reaction zone utilized; it should, of course, not be so great as to cause flooding or undesired entrainment of the material being oxidized.

Those skilled in the art will, of course, recognize the varying amounts of the oil produced by the oxidation of cyclohexane (e.g., as carried out in Example 5) can be utilized as an initiator for the oxidation of cyclohexane. In general, it is not necessary to utilize more than about 0.5 to 1 part of oil per 100 parts cyclohexane undergoing oxidation, it being understood that larger amounts can be utilized.

While acetic acid has been used as the reaction medium in the foregoing examples, it will be realized that equally good results are obtained utilizing any of the saturated carboxylic acids having from 2 to 6 carbon atoms per molecule as reaction solvents. Moreover, a variety of other reaction media can be employed among which chlorobenzene, t-butyl alcohol, etc., can be mentioned. In general, almost any substance which will act as a solvent for the reactants and which is itself not oxidized or, at least, not readily oxidized can be used. Of course, as will at once be evident, a change in solvent may require a change in the anion of the salt used for introduction of the manganese, copper and iron oxidation catalysts. Thus, while in acetic acid these metal ions can profitably be used as acetates, in, for example, chlorobenzene, the insolubility of acetates dictates that the metal ion catalysts be used as naphthenates. Such changes are obvious to practitioners in the field of metal ion catalyzed oxidations using molecular oxygen.

In view of the foregoing disclosures, variations and modifications thereof will be apparent to one skilled in the art, and it is intended to include within the invention all such variations and modifications except as do not come within the scope of the appended claims.

What is claimed is:

1. The process for the production of adipic acid from cyclohexane by oxidizing cyclohexane in the liquid phase with molecular oxygen in a first oxidation zone to produce a mixture of cyclohexanone, cyclohexanol and oxygenated products together with unreacted cyclohexane, said cyclohexanone and cyclohexanol being contained in a ratio by weight of cyclohexanone to cyclohexanol of at least about 1, separating by distillation unreacted cyclohexane and recycling it to said first oxidation zone, oxidizing said mixture of cyclohexanol, cyclohexanone and other oxygenated products at a temperature in the range of 60° to 105° C. with molecular oxygen in the liquid phase in a saturated carboxylic acid solvent having 2 to 6 carbon atoms in a second oxidation zone in the presence of a catalytic amount of a manganese salt soluble in said solvent and separating adipic acid therefrom.

2. The process of claim 1 wherein the said mixture is oxidized at a temperature in the range of 85° to 95° C.

3. The process of claim 1 wherein said solvent is acetic acid and said manganese salt is manganese acetate.

References Cited by the Examiner

UNITED STATES PATENTS

| 2,452,741 | 11/1948 | Fleming | 260—537 |
| 2,557,282 | 6/1951 | Hamblet et al. | 260—531 |
| 2,831,024 | 4/1958 | Brown et al. | 260—537 |
| 2,851,496 | 9/1958 | Cates et al. | 260—531 |

FOREIGN PATENTS

| 451,806 | 10/1948 | Canada. |
| 738,808 | 10/1955 | Great Britain. |

LORRAINE A. WEINBERGER, *Primary Examiner.*

LEON ZITVER, *Examiner.*